April 15, 1952      H. D. SMITH      2,593,209
CLOSURE AND CLOSURE OPERATOR FOR VEHICLE HOISTS
Filed July 3, 1948      3 Sheets-Sheet 1
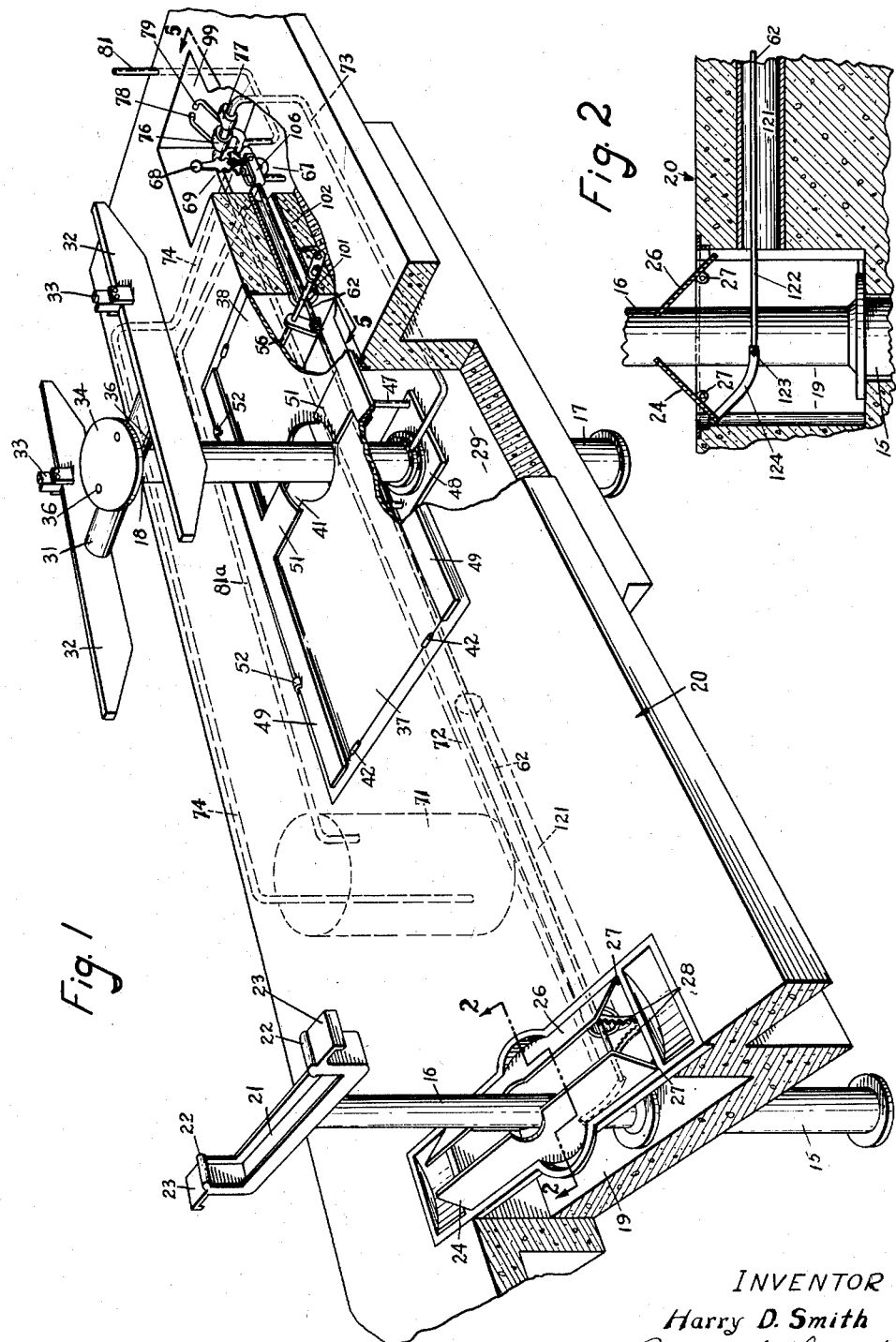
INVENTOR
Harry D. Smith
By Rudolph L. Lowell
atty.

April 15, 1952 H. D. SMITH 2,593,209
CLOSURE AND CLOSURE OPERATOR FOR VEHICLE HOISTS
Filed July 3, 1948 3 Sheets-Sheet 2

INVENTOR
Harry D. Smith
By
atty.

April 15, 1952 H. D. SMITH 2,593,209
CLOSURE AND CLOSURE OPERATOR FOR VEHICLE HOISTS
Filed July 3, 1948 3 Sheets-Sheet 3
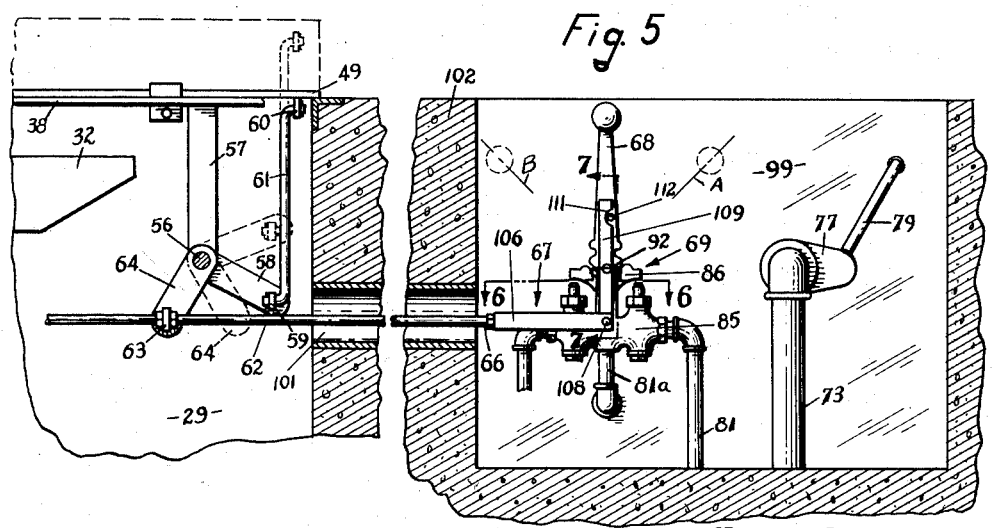
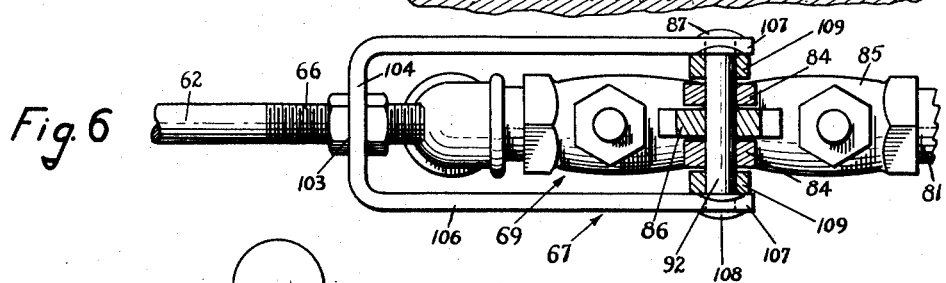
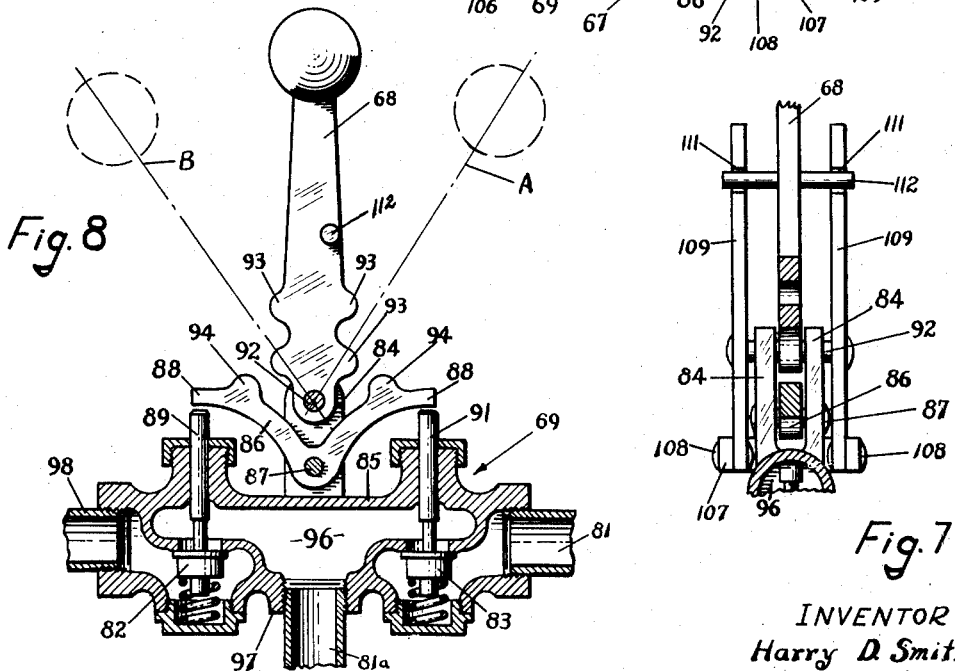
INVENTOR
Harry D. Smith
By
Atty.

Patented Apr. 15, 1952

2,593,209

UNITED STATES PATENT OFFICE 2,593,209

CLOSURE AND CLOSURE OPERATOR FOR VEHICLE HOISTS

Harry D. Smith, Philadelphia, Pa., assignor to Globe Hoist Company, Des Moines, Iowa, a corporation of Iowa Application July 3, 1948, Serial No. 37,012

5 Claims. (Cl. 254—89)

This invention relates generally to vehicle hoists and in particular to a pit closure means for a vehicle hoist having a lift member mounted in a floor pit for movement to a lowered position below the level of the floor surface. Pit mounted vehicle hoists of this type provide for the pit being completely covered when the lift member is lowered therein, so that the space occupied by the hoist is unobstructed for the free travel of vehicles and garage equipment thereover when the hoist is not in use.

It is an object of this invention to provide an improved vehicle hoist of pit mounted type.

A further object of this invention is to provide an improved pit closure means for a pit mounted hoist.

Another object of this invention is to provide a pit mounted hoist of a full hydraulic type having an oil reservoir adapted to receive air under pressure to raise the lift member, in which an air valve has an actuating lever connected with a pit closure means through a lost motion mechanism such that the closure means is closed when the actuating lever is in a neutral position, and is moved to a pit open position in response only to the movement of the actuating lever to a position providing for the exhaust or release of air from the oil reservoir.

A further object of this invention is to provide a pit closure means for a pit mounted hoist which is of a simple and compact construction, efficient in operation so as to always be in an open position when the hoist is to be lowered into the pit, capable of being opened by the hoist as the hoist is raised from the pit, and adapted to operate over prolonged periods of time with a minimum of service and maintenance attention.

A feature of this invention is found in the provision of a pit mounted hoist of a full hydraulic type in which a pair of oppositely arranged pit cover members are supported on opposite side walls of the pit for pivotal movement toward each other to a pit closing position. A rock shaft, supported within the pit, is extended between and connected with the cover members so that the cover members are concurrently movable in response to a rocking movement of the shaft. An air pressure system, connected with an oil reservoir for the lift member of the hoist, includes a valve unit for controlling the admission of air under pressure to and the release of such air from the oil reservoir. A manually actuated handle for the valve unit is connected through a lost motion connection with the rock shaft so that the closure means is opened when the handle is actuated to provide for a release of air under pressure from the reservoir, and closed when the handle is actuated to a neutral position at which the air valve unit is closed. The handle is ineffective to operate the rock shaft, when the handle is moved to a position providing for the admission of air under pressure to the reservoir.

Further objects, features and advantages of this invention will become apparent from the following description when taken in connection with the accompanying drawings, in which:

Fig. 1 is a perspective view of a vehicle lift of two post type embodying the pit closure means of this invention, with certain parts being broken away and with the pit closing doors for the front hoist being illustrated in their open positions to more clearly show the construction of the closure means;

Fig. 2 is an enlarged sectional detail view taken on the lines 2—2 in Fig. 1, showing a portion of the closure actuating means for the front hoist;

Fig. 5 is an enlarged sectional detail view taken substantially along the line 5—5 in Fig. 1;

Figure 9:
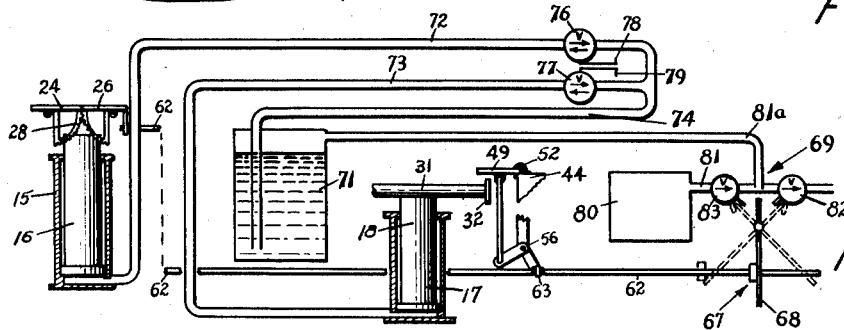

Figs. 6 and 7 are enlarged sectional views of an air valve unit as seen on the lines 6—6 and 7—7, respectively, in Fig. 5;

Fig. 8 is a vertical longitudinal sectional view of the air valve unit shown in Fig. 6; and Fig. 9 is a diagrammatic showing of the air and oil systems for the hoist.

With reference to the drawings, there is shown in Fig. 1 an automobile hoist of two-post type including front and rear hoists, with the front hoist having a cylinder 15 operatively associated with a piston or lift member 16 and the rear hoist including a cylinder 17 and associated piston 18.

The front hoist is located in a pit 19 formed in a floor surface, indicated generally as 20, and includes a front axle supporting structure or saddle 21, of a substantially U-shape, fixed to the top of the piston 16 and having a raised axle-engaging rib 22 at the free end of each of its legs. Supports 23 for engaging automobile spring pads are extended outwardly from the axle engaging ribs 22.

The opening at the top of the pit 19 is of a size and shape such that the saddle member 21, at the lowermost limit of travel of the piston 16, is received within the pit below the surface of the floor 20. With the saddle 21 thus located within the pit 19, the pit opening is closed by a pair of floor or cover plates 24 and 26 having their outer sides pivoted at 27 on opposite side walls of the pit 19, for pivotal movement upwardly and away from each other to their open positions, shown in Fig. 1, and for movement downwardly and toward each other to closed and supported positions on the ribs 22. The cover plates 24 and 26 are provided at one of their ends with meshed gear segments 28 whereby the covers are concurrently movable in response to the pivotal movement of one thereof, for a purpose which will appear later.

The rear hoist is mounted in a floor pit 29 (Fig. 1) and includes a rear axle supporting structure having a transversely extended tubular beam member 31 fixed at its central portion to the top of the piston 18. Each end of the tubular beam 31 carries a flat upright longitudinally extended supporting member 32. Slidably carried on the top edge of each upright supporting member 32, for movement longitudinally thereof, is a rear axle engaging block 33.

Adapted to rest on the top of the tubular beam 31, at a position above the piston 18, is a vertically movable cover plate 34 of a circular shape. The plate 34 is guided for up and down movement by a pair of extensions 36, one of which only is shown in Fig. 1, arranged at opposite sides of the piston 18 and extendible through the tubular beam member 31.

The opening of the rear pit 29 is of a size and shape such that when the piston 18 is at its lowermost limit of travel, the rear axle supporting structure is receivable therein at a position below the level of the floor 20. A closing of the pit opening, when the rear hoist is in either a lowered or raised position, is accomplished by the provision of means including a pair of stationary cover members 37 and 38.

Figure 3:
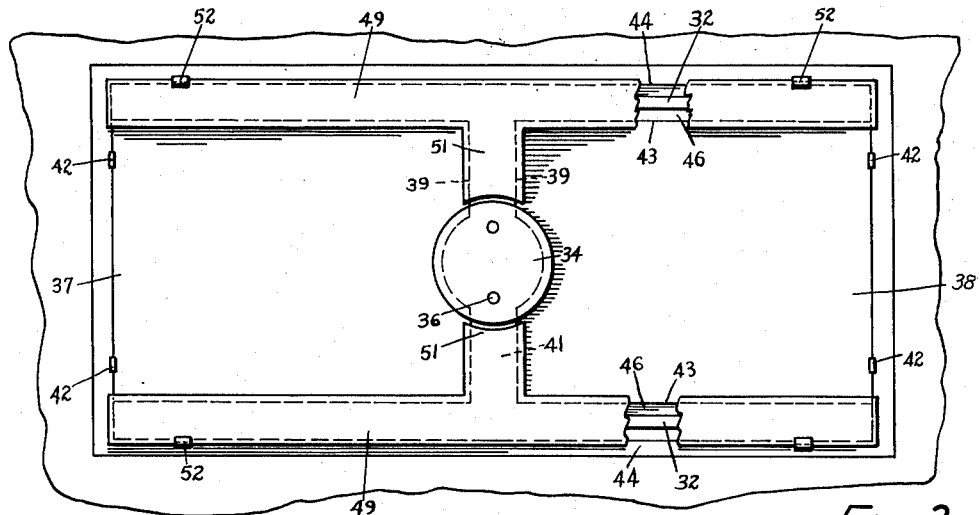
Fig. 3 is an enlarged plan view of the rear hoist showing the closure means therefor in a pit closing position, but with certain parts broken away.
Figure 4:
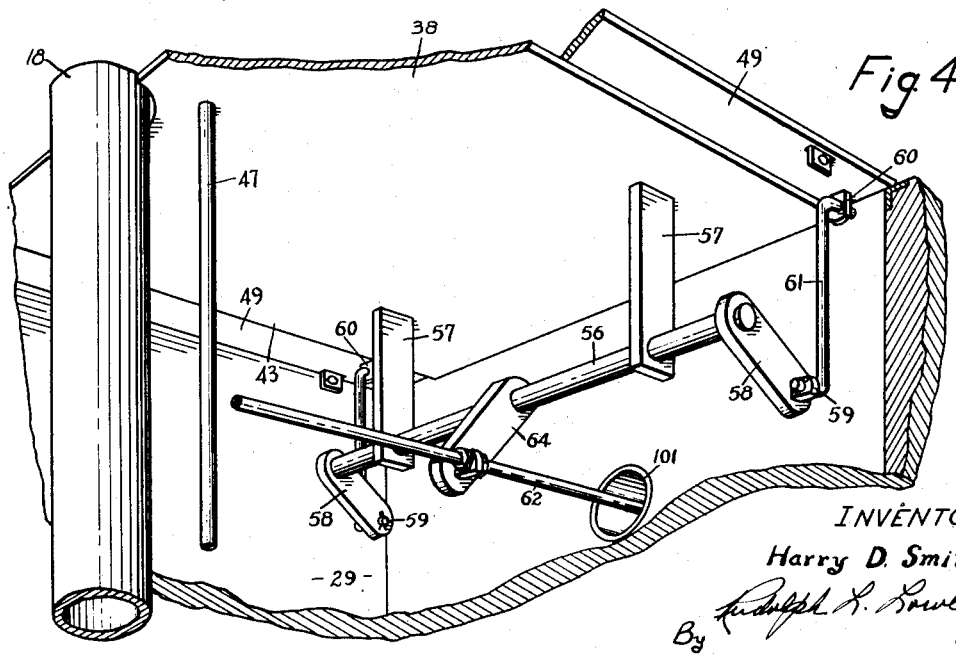
Fig. 4 is an enlarged fragmentary perspective view of the rear hoist looking in a direction generally upwardly and rearwardly, and with the pit closure means in a closed position.

With reference to Figs. 1 and 3, it is seen that the cover plates 38 and 37 are of a substantially rectangular shape with their inner ends 39 spaced apart from each other to form a transverse opening 41 adapted to receive the transverse beam member 31 therethrough. The outer ends of the cover plates 37 and 38 are pivoted at 42 to the opposite end walls of the pit opening 29. The opposite sides 43 of the cover plates 37 and 38 are spaced from the adjacent sidewalls 44 of the pit 29 to form longitudinally extended openings 46, open to the opposite ends of the transverse opening 41 and adapted to receive the support members 32 therein. Each plate 37 and 38, adjacent its inner end, carries a pair of downwardly projected support rods 47 (Figs. 1 and 4) the lower ends of which rest on a square shaped flange member 48 mounted about the top of the cylinder 17. The plates 37 and 38 are thus firmly supported in positions substantially flush with the floor 20.

With the rear hoist in its lowered position within the pit 29, the transverse opening 41 is covered over its central portion by the vertically movable cover plate 34 which is guidably supported in the beam member 31. The end portions of the transverse opening 41, and the longitudinal openings 46, are closed by a pair of oppositely arranged longitudinally extended pivoted cover members 49 having lateral ears or extensions 51 projected inwardly toward each other at positions overlying the transverse opening 41 at opposite sides of the piston 18. The covers 49 are pivoted at 52 on the upper ends of the pit side walls 44.

In elevating the rear hoist from within the pit 29, the cover members 49 are engaged and moved upwardly and away from each other by the axle blocks 33 whereby to open the longitudinal openings 46 and the transverse opening 41. During this raising of the rear hoist, the cover plate 34 is without movement until it is engaged and carried upwardly by the transverse beam member 31.

When the hoist is elevated to a position such that the support members 32 are out of engaging positions with the covers 49, the cover members 49 are returned to their closed positions by gravity, as illustrated in Fig. 1, whereby a garage or service man is free to move about below the rear hoist without danger of slipping into the pit 29.

When the rear hoist is to be lowered, the pivoted cover members 49 are initially moved to their open positions to provide for the passage of the cross member 31 and the support members 32 within the spaces 41 and 46, respectively. On a lowering of the rear hoist within the pit 29, the cover plate 34 is engaged in a supported position on the stationary cover members 37 and 38. When the rear hoist is lowered entirely within the pit 29 below the level of the floor surface 20, the pivoted covers 49 are moved to their closed positions by the action of gravity. Thus, as clearly appears in Fig. 3, when the rear hoist is in a lowered position within the pit 29, the stationary cover members 37 and 38, the pivoted covers 49, and the vertically movable cover plate 34 cooperate to completely close the pit opening 29. The pivoted covers 49 are operated by means including a rock shaft 56 (Figs. 1 and 4) which is rotatably supported in a pair of oppositely arranged bearing members 57 projected downwardly from the cover plate 38 at positions adjacent to the rear end of such cover plate. The opposite ends of the rock shaft 56 project outwardly from the bearings 57 and terminate at positions below the pivoted cover plates 49. Rock arms 58, at the ends of the rock shaft 56, are pivotally connected at 59 to levers or links 61, which in turn are pivoted at 60 to the pivoted cover members 49. It is seen, therefore, that the pivoted cover members 49 are movably connected together for concurrent pivotal movement in response to a rocking action of the shaft 56.

This rocking action of the shaft 56 is accomplished manually by means including a manually actuated control rod 62 (Figs. 1 and 5) which is connected at 63 to a rock arm 64 mounted on the rock shaft 56. The rear end 66 of the control rod 62 is connected through a lost motion mechanism, designated generally as 67, with a valve handle 68 forming part of an air control valve unit, indicated generally at 69.

As previously mentioned, the hoist illustrated is of a full hydraulic type and the means for raising and lowering the lift members 16 and 18 includes an oil reservoir 71 (Figs. 1 and 9) connected with the front hoist cylinder 15 through an oil line 72 and with the rear hoist cylinder 17 through an oil line 73. The oil lines 72 and 73 have a common connection 74 with the reservoir 71. Oil valves 76 and 77, for controlling the admission of oil under pressure to the cylinders 15 and 17, respectively, are connected in the oil supply lines 72 and 73, respectively, at positions adjacent to each other. The control handles 78 and 79, for the valves 76 and 77, respectively, are relatively constructed and arranged so as to be capable of being gripped and operated by one hand for simultaneous operation of the lift members 16 and 18.

Air under pressure is supplied to the oil reservoir 71 from a suitable source of supply 80 (Fig. 9) through air lines 81 and 81a. The air valve unit 69, which controls the admission of air to and the release of air from the oil reservoir 71, is connected between the air lines 81 and 81a.

The air valve unit 69 (Fig. 8) includes a pair of like valve members 82 and 83 arranged at opposite sides of a pair of transversely spaced pivot supports 84 projected upwardly from the housing or casing 85 of the valve unit 69. A valve actuating member 86, of a substantially V-shape, is pivoted at 87 between the supports 84 and has its free ends 88 arranged so as to alternately engage the valve stems 89 and 91 for the valve members 82 and 83, respectively.

The handle 68 is pivoted at 92 between the upper ends of the supports 84 and is integrally formed adjacent its pivoted end with oppositely arranged pairs of locking members 93, adapted to releasably engage therebetween coacting locking members 94 formed on the actuating member 86 at positions adjacent the free ends 88 thereof.

The casing 85 is formed with a longitudinally extended air passage 96, common to the valve members 82 and 83, and provided between such valve members with a connection 97, which is connected with the oil reservoir 71 through the air line 81a.

When the operating handle 68 is in its neutral or central position, shown in full lines in Fig. 8, both of the valve members 82 and 83 are closed and the actuating member 86 is out of contact engagement with the valve stems 89 and 91. To admit air under pressure to the oil reservoir 71, the handle 68 is moved in a clockwise direction to its dotted line position indicated at A in Fig. 8. This movement of the handle 68, through the actuating member 86, depresses the stem member 91 to open the valve member 83. Air under pressure is thus admitted from the air line 81 through the valve 83, passage 96 and air line 81a to the oil reservoir 71.

It is to be noted that the lift members 16 and 18 are not operated on this manipulation of the handle 68, by virtue of the fact that the oil valves 76 and 77 are closed. To maintain the oil in the reservoir 71 under pressure the handle 68 is returned to its neutral position.

When air is to be released from the oil reservoir, the handle 68 is moved in a counter-clockwise direction from its full line position shown in Fig. 8, to its dotted line position indicated at B, whereby the valve member 82 is opened. Air from the reservoir 71 is thus permitted to flow through the line 81a, passage 96 and valve 82 to the atmosphere through an exhaust outlet 98 formed in the valve casing 85. This release or exhaust of air is stopped by returning the handle 68 to its neutral position.

As best appears in Figs. 1 and 5, the air valve unit 69 and the oil valves 76 and 77 are arranged in a floor pit 99 located rearwardly from the floor pit 29 with the handles 68, 78 and 79 being arranged adjacent to each other at positions near the top of the pit 99 so as to be conveniently and readily accessible to the hoist operator.

The control rod 62 (Fig. 5) extends rearwardly from the rock arm 64 through an opening 101 formed in a partition wall 102 between the floor pits 29 and 99, and has its rear end 66 adjustably connected at 103 to the base 104 of a U-shape member 106 horizontally arranged in a straddling relation with the air valve unit 69. The U-member 106 forms part of the lost motion mechanism 67. The rear or free ends 107 of the legs of the U-member 106 are pivotally connected at 108 to the lower ends of a pair of upright pivoted levers 109 positioned at opposite sides of the pivot supports 84, and pivoted intermediate their ends on the pivot 92 for the handle 68 (Figs. 5, 6 and 7).

The rear sides of the members 109, near the upper ends thereof, are formed with notches 111 to receive a pair of oppositely arranged pins 112 which are extended laterally in opposite directions from the handle 68.

On movement of the handle 68 toward the right, as viewed in Figs. 5 and 8, to open the valve 83 and admit air under pressure to the reservoir 71, the pins 112 are moved out of the notches 111 so that no movement is imparted to the control rod 62 in response to a movement of the handle 68. On actuation of the handle 79 for the oil valve 77, to elevate the lift member 18, the covers 49 are engaged and moved to their open positions by the upward movement of the axle blocks 33. On elevation of the blocks 33 and upright supports 32, out of engaging positions with the covers 49, the covers 49 are moved to their closed positions by the action of gravity.

When the lift member is to be returned to a lowered position within the floor pit 29, on actuation of the handle 68 toward the left, as viewed in Fig. 5, or from its full position to its dotted line position B, shown in Fig. 8, the levers 109 are engaged by the pins 112 whereby the control rod 62 is moved rearwardly, or to the right, as viewed in Fig. 5, to in turn provide for a rocking movement of the rock arm 64 from its full line position to its dotted line position, also shown in Fig. 5. This pivotal movement of the rock arm 64, through the rock arms 58 and levers 61, provides for a concurrent upward movement of the pivoted covers 49 to their open positions. These open positions of the covers 49 are maintained until the handle 68 is returned to its neutral position. The levers 109 follow the handle 68 to its neutral position, in response to the downward movement of the covers 49 by the action of gravity.

It is seen, therefore, that on the admission of air under pressure to the oil reservoir 71, the pivoted covers 49 remain in their closed positions, and that on movement of the handle 68 to release air from the oil reservoir 71, the pivoted covers 49 are manually moved to their open positions in response to the manipulation of the handle 68. The lost motion mechanism 67 thus provides for a manual actuation of the pivoted covers 49 in response only to the movement of the handle 68 to open the valve 82.

The cover members 24 and 26 for the front lift member 16 are operated concurrently with the rear pivoted covers 49 by extending the control rod 62 through an opening 121 extended between the front pit 19 and the rear pit 29. The front end 122 of the control rod 62 (Fig. 2) is pivoted at 123 to a crank arm 124 projected downwardly from the cover plate 24 at a position forwardly of the cover pivot 27. On a rearward movement of the control rod 62, in response to a movement of the handle 68 to its position providing for a release of air from the oil reservoir 71, the front cover 24 is moved from its dotted line position to its full line position shown in Fig. 2. The rear cover plate 26 is concurrently moved to its open position by virtue of the meshed engagement of the gear segments 28. On movement of the handle 68 to its neutral position, the covers 24 and 26 are moved to their closed positions by the action of gravity.

It is seen, therefore, that the front covers 24 and 26, and rear pivoted covers 49 are connected together through the control rod 62 for concurrent movement in response to an operation of the handle 68 for the air valve unit 69. It is to be noted also that the front cover plates 24 and 26, when the lift member 16 is elevated from the floor pit 19, are engaged and moved by the saddle member 21 to their open positions. Further, the control rod 62 is arranged relative to the front and rear hoist frame structures so as to be in a clearance relation therewith when the hoists are in lowered positions within their respective floor pits.

From a consideration of the above description, it is seen that the invention provides a closure means for a full hydraulic hoist of pit-mounted type, in which the closure means, on a raising of the hoist lift members, are engaged and moved by said lift members to their open positions. On a manipulation of the control handle 68 for the air valve unit 69, to exhaust air from the oil reservoir 71 to lower the lift members, the cover members are movable in response to a movement of the handle 68 to their open positions. A closing of the pit closure means, both after the hoist is elevated from the pit, or lowered within the pit, takes place by the action of gravity.

Although the invention has been described and illustrated with respect to a full hydraulic hoist, in which air under pressure is applied on the oil supplied to the cylinders for the lift members, it is to be understood that it is readily applicable to hoists of pump operated type, namely, in which oil under pressure is supplied directly to the lift members from a pump unit or the like, by merely connecting the valve unit 69 in the oil supply line to the lift cylinders.

Further, although the invention has been described and illustrated with respect to a preferred embodiment thereof, it is to be understood that it is not to be so limited since changes and modifications can be made therein which are within the full intended scope of this invention, as defined by the appended claims.

I claim:

1. In a full hydraulic hoist having a lift member mounted in a floor pit and movable to a lowered position within the pit, means for closing said pit including a pair of oppositely arranged cover members pivoted on side walls of said pit for pivotal movement toward each other to pit closing positions, movable means in said pit connecting said cover members together for concurrent pivotal movement, means for raising and lowering said lift member including an oil reservoir and a source of air under pressure, an air connection between said reservoir and said source of air including a valve unit having valve members for admitting air to and releasing air from said oil reservoir, a pivoted actuating member for said valve unit associated with said valve members such that on movement of said actuating member in one direction, away from a neutral position, air under pressure is admitted to said reservoir, and on movement of said actuating member in an opposite direction from said neutral position, air is released from said oil reservoir, with said valve unit being closed when the actuating lever is in a neutral position, means connecting said actuating lever with said movable means to provide for an opening movement of said cover members concurrently with the release of air under pressure to said oil reservoir, and means for controlling the supply of oil from said reservoir to said lift member.

2. In a full hydraulic hoist having a lift member mounted in a floor pit and movable to a lowered position within the pit, means for closing said pit including a pair of oppositely arranged cover members pivoted on sidewalls of said pit for pivotal movement toward each other to pit closing positions, movable means in said pit connecting said cover members together for concurrent pivotal movement, means for raising and lowering said lift member including a fluid control system having a source of fluid under pressure, a valve unit in said fluid system for controlling the admission and release of fluid under pressure to said lift member, an actuating lever for said valve unit, and means connecting said movable means with said lever for movement in response to said lever such that said cover members are opened when said lever is moved to release high pressure fluid from said lift member.

3. In a full hydraulic hoist having a lift member mounted in a floor pit and movable to a lowered position within the pit, means for closing said pit including a pair of oppositely arranged cover members pivoted on opposite side walls of said pit for pivotal movement toward each other to pit closing positions, means within said pit connecting said cover members together for concurrent pivotal movement, means for supplying fluid under pressure to said lift member, valve means for controlling the admission and release of fluid under pressure to said lift member, including a manually actuated lever, and means connecting said lever with said cover connecting means such that said cover members are pivotally moved to open positions in response to a movement of said lever to release fluid under pressure from said lift member.

4. In a full hydraulic hoist having a lift member mounted in a floor pit and movable to a lowered position within the pit, means for closing said pit including a pair of oppositely arranged cover members pivoted on opposite side walls of said pit, means within said pit connecting said cover members together for concurrent pivotal movement including a rock shaft extended between said cover members, said covers being pivotally movable toward each other to pit closing positions, means for supplying fluid under pressure to said lift member to raise and lower the same including a fluid reservoir, means for applying and releasing air under pressure on the fluid in said reservoir including a valve unit having an actuating handle, and means connected between said handle and said rock shaft to provide for a movement of said cover members to pit opening positions on actuation of said handle to release air from said reservoir.

5. In a full hydraulic hoist having a pair of lift members mounted in floor pits and movable to lowered positions within the pits, means for closing said pits including a pair of pivoted cover members for each of said pits movable inwardly toward each other to pit closing positions, movable means interconnecting said cover members for concurrent pivotal movement, means for raising and lowering said lift members including a fluid system, means for applying a pressure on the fluid in said system, valve means for controlling the application and release of said fluid pressure on said lift members, including an actuating member, and means connecting said actuating member with said movable means such that said cover members are moved to pit opening positions in response to a movement of said actuating member to a position for releasing the fluid pressure on said lift members, with said connecting means being ineffective to move said movable means on movement of said actuating member to a position for applying the fluid pressure on said lift members.

HARRY D. SMITH.

REFERENCES CITED

The following references are of record in the file of this patent:

UNITED STATES PATENTS

| Number | Name | Date |
|---|---|---|
| 2,015,357 | Weaver | Sept. 24, 1935 |
| 2,107,210 | Palm | Feb. 1, 1938 |
| 2,464,731 | Thompson | Mar. 15, 1949 |